(12) United States Patent
Iftime et al.

(10) Patent No.: US 7,918,485 B2
(45) Date of Patent: Apr. 5, 2011

(54) SECURITY SYSTEM USING CONDUCTIVE AND NON-CONDUCTIVE REGIONS

(75) Inventors: Gabriel Iftime, Mississauga (CA); Yiliang Wu, Mississauga (CA); Paul F. Smith, Oakville (CA); Peter M. Kazmaier, Mississauga (CA); Beng S. Ong, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 1163 days.

(21) Appl. No.: 11/563,989

(22) Filed: Nov. 28, 2006

(65) Prior Publication Data

US 2008/0122881 A1 May 29, 2008

(51) Int. Cl.
 *B42D 15/00* (2006.01)
 *B42D 1/00* (2006.01)
 *B42D 15/10* (2006.01)
(52) U.S. Cl. .................. 283/83; 281/2; 283/61; 283/72; 283/82; 283/84; 283/94; 283/95; 283/100; 283/901
(58) Field of Classification Search .............. 281/2, 3.1, 281/38, 41, 51; 283/61, 72, 81, 82, 83, 84, 283/94, 95, 100, 107, 108, 109, 117, 901
See application file for complete search history.

(56) References Cited

U.S. PATENT DOCUMENTS

| | | | |
|---|---|---|---|
| 5,122,187 A | 6/1992 | Schwarz et al. | |
| 5,128,525 A | 7/1992 | Stearns et al. | |
| 5,168,147 A | 12/1992 | Bloomberg | |
| 6,096,124 A | 8/2000 | Wong et al. | |
| 6,176,909 B1 | 1/2001 | Malhotra et al. | |
| 6,187,083 B1 | 2/2001 | Malhotra et al. | |
| 6,593,398 B2 | 7/2003 | Breton et al. | |
| 6,906,118 B2 | 6/2005 | Goodbrand et al. | |
| 7,032,828 B2 * | 4/2006 | Krul et al. | 283/83 |
| RE39,490 E * | 2/2007 | Cote et al. | 283/82 |

OTHER PUBLICATIONS

U.S. Appl. No. 11/548,775, filed Oct. 12, 2006.
U.S. Appl. No. 11/548,774, filed Oct. 12, 2006.

* cited by examiner

*Primary Examiner* — Dana Ross
*Assistant Examiner* — Justin V Lewis
(74) *Attorney, Agent, or Firm* — Oliff & Berridge, PLC

(57) ABSTRACT

Disclosed is an item, for example a document, including a substrate having thereon a multiplicity of separate printed markings, wherein the printed markings include both conductive printed markings and substantially non-conductive printed markings. The different conductive and substantially non-conductive regions on the substrate can be detected, for example by measuring the resistance or current of each printed marking. The pattern of different conductive and substantially non-conductive regions can be used as a security pattern of authenticity that cannot be replicated by standard office equipment, and/or can be used to encrypt information in binary code form in the item. A system for forming and detecting the different printed markings is also described.

14 Claims, No Drawings

SECURITY SYSTEM USING CONDUCTIVE AND NON-CONDUCTIVE REGIONS

BACKGROUND

1. Field

Described herein is an item, such as a document, commercial packaging, and the like, comprised of a substrate having thereon a multiplicity of separate, non-touching printed markings, wherein the printed markings include both conductive printed markings and substantially non-conductive printed markings. Also described are methods of forming the item with security markings thereon and systems for forming and subsequently detecting the security markings. The different conductive and non-conductive regions on the substrate can be detected, for example by measuring the resistance or current of each printed marking. Advantages of the pattern of different conductive and non-conductive regions include being used as a security pattern of authenticity that cannot be replicated by standard office equipment such as photocopiers and scanners, and/or being used to encrypt information, for example in binary code form in the item.

2. Background Discussion

Conductive inks have been known to be used as an overt (that is, easy to see) security printing feature. The main advantage of the metallic inks is that they do not copy well using photocopiers and produce copies that are easily distinguishable from original documents. However, as it happens with any relatively old security printing technology, metallic ink technology is at risk of being counterfeited. Until recently, the technology has been relatively well protected due to a controlled supply/end-user chain. However, metallic inks are now currently being developed for many additional applications, such as printing antennas for RFIDs. This has resulted in a wide spread use, and much less controlled chain of distribution, of printable metallic inks. The inks may thus become more readily available to counterfeiters seeking to use the inks to replicate authentic items and documents.

It is estimated that worldwide counterfeiting and piracy cost brand owners over $500 billion every year. As a result, document and product security is of key importance for companies to protect their products and brand against counterfeiting. With the proliferation of digital printing, there is a need to protect printed documents, and document security needs to keep step.

Given that metallic inks represent a well established technology and are easy to implement, in order to continue to use them for security printing, novel methods of using metallic conductive ink are required.

There is thus a constant need for new technologies, systems and processes for providing security markings on an item, for example to encrypt information therein and/or to provide means for verification/authentication. Further, there is a need for new uses of conductive inks in security applications that will make it difficult for counterfeiters possessing the inks to easily replicate authentic items and documents.

SUMMARY

These and other objects may be achieved herein by providing an item including a substrate having thereon a multiplicity of separate printed markings, wherein the printed markings include both conductive printed markings and substantially non-conductive printed markings. The different conductive and substantially non-conductive regions on the substrate can be detected, for example by measuring the resistance or current of each printed marking. The pattern of different conductive and substantially non-conductive regions can be used as a security pattern of authenticity that cannot be replicated by standard office equipment, and/or can be used to encrypt information in binary code form in the item.

Herein, the conductive marking materials, such as conductive inks, may be used to provide covert, instead of the prior overt, security technologies.

In embodiments, described is a method of preparing an item having security elements formed thereon, comprising forming a multiplicity of separate printed markings on a substrate, wherein the printed markings include both conductive printed markings and substantially non-conductive printed markings, with an image forming device.

Also described is a system for embedding and verifying security elements on a substrate, comprising an image forming device containing at least one conductive marking material and at least one substantially non-conductive marking material, which forms a multiplicity of separate printed markings, and wherein the printed markings include both conductive printed markings and substantially non-conductive printed markings on the substrate, and a detection device that detects the conductivity of each of the printed markings.

EMBODIMENTS

Thus, described herein is a covert technology using conductive inks. The technology encrypts information through the formation of both conductive and substantially non-conductive markings on a substrate. Substantially non-conductive refers to, for example, having no conductivity or being insulative, or having such low conductivity as to be read as non-conductive by the reader, or having a relatively lower conductivity for example by a factor of 2 or more when compared to the conductive markings in the same item, so that the difference could be easily detected by the readers.

The conductive and substantially non-conductive areas are indistinguishable to a human viewer. That is, the conductive and non-conductive printed markings have a substantially same appearance to a human viewer. However, an electronic reader can detect exactly which of the areas are conductive and which are not. Thus, encryption and customization become possible. For example, a printed set of markings, for example in the form of a barcode or a pattern of dots or rectangles, made of, for example, 20 printed regions that appear identical to the human eye, can have any combination of conductive/non-conductive regions, to a total of 1,048,576 combinations. This provides a covert authentication method, which can fool counterfeiters and make counterfeiting very difficult.

Printed markings refers to, for example, markings formed onto a substrate via any known print technology, and includes, for example, handwriting and the use of image forming devices such as an ink jet device, a xerographic device, and the like. Substrate refers to, for example, any substrate of any kind upon which the printed markings may be formed. The substrate may comprise any material, for example such as paper, cardboard, plastic and the like, and is necessarily non-conductive so that the conductive printed markings can be subsequently detected The substrate may be in any form, for example a document, product packaging, a commercial product, and the like.

The printed markings on the substrate include any set or multiplicity of printed markings including both conductive printed markings and substantially non-conductive printed markings. The set, or one or more subsets of the set, of printed markings may be non-touching, for example so that the separate markings can be accurately located and detected by the reader. Non-touching refers to any dimension of spacing or separation of the markings, so long as the spacing is sufficient to avoid two adjacent markings from sharing conductivity. The minimum spacing may be very small, and is typically only limited by the resolution of the image forming device. Of course, the separate printed markings may also touch, without restriction. This is not a problem with respect to touching conductive and non-conductive portions, as the reader will distinguish between the portions even though the printed markings are touching. However, for adjacent touching conductive markings, additional controls will be needed so that the reader understands the conductive portions represent two or more adjacent markings instead of one conductive marking. Such controls may include the use of printed markings having predetermined widths or heights so that the reader makes a determination for each section at the predetermined width or height intervals. Keys may also be embedded into the document so that the reader understands where the printed markings to scan for are located.

The printed markings themselves may take any suitable or desirable form. For example, the printed markings may be in the form of dots or blocks, glyphs, text, bar codes, stacked bar codes, matrix codes, codes such as PDF417, and the like.

The printed markings may be used to form a same pattern of conductive and substantially non-conductive markings on the substrate. In this way, a given user of the technology can set the pattern, and can then readily determine if items are authentic or not by scanning the item for the pattern. If the pattern does not match, the item can be determined to lack authenticity. That is, each user can have its own pattern of conductive/non-conductive regions, and each user would have a reader that authenticates only his own pattern. This significantly decreases the chances of counterfeiting. This can also be used with document security, where the user can set the pattern, and then the same user or another user can have the document scanned to confirm the documents authenticity.

In embodiments, the conductive and substantially non-conductive printed markings can be used to embed information upon the substrate. For example, the printed markings may embed information in binary form, for example encoding 0s and 1s. For example, the conductive printed markings may be made to represent one of 0s or 1s, and the substantially non-conductive printed markings the other of 0s or 1s. The different conductive/non-conductive portions can be recognized and distinguished by the reader, as will be discussed further below, and thus the different conductive/non-conductive regions can be used to encode the different digital data values.

In embodiments, the printed markings may be comprised of a self-locking glyph code as disclosed in, for example, U.S. Pat. Nos. 5,128,525 and 5,168,147, the disclosures of each of which are totally incorporated herein by reference. Glyphs represent 0 and 1 bits in a document encoding scheme. The glyphs may be printed at a substantially uniform distance from each other, so that the center of each glyph is a substantially uniform distance from the center of adjacent glyph(s). These marks can be printed at very high densities of, for example, about 3,600 data bits per square inch or higher, and scanned with a 300 pixel per inch scanner. Data is encoded by the shape or the rotational orientation of the mark. Clocking can be taken from the data itself without synchronization marks external to the data. By placing a mark at each data bit position, it is easier to synchronize the reading process of the data without the use of registration marks. The number of bits that can be represented by each symbol is related to the total number of symbols in the code; when the number of bits to be represented by a symbol is "n", the total number of glyphs possible in the code is $2^n$ distinctive glyphs. For example, in a code wherein two distinct glyphs are possible, such as / and \, each symbol may represent one bit; for example, /=1 and \=0. In a code wherein four distinct glyphs are possible, such as /, —, \, and |, each symbol can represent two bits; for example, /=00, |=01, \=10, and —=11. In a code wherein eight distinct glyphs are possible, each symbol can represent three bits, and the like. Data can be encoded in the shape of the glyphs, the rotation of the glyphs, or in any other desired variation.

In embodiments, the glyphs are elliptical marks, and in a simple code wherein two distinct shapes are possible, the glyphs preferably are elliptical marks rotated from the vertical at either about +45° (for example, "/") or −45° (for example "\"). The use of orthogonally-oriented marks potentially allows for a large degree of discrimination between data bit 1 and data bit 0. The marks may be inclined at about 45°, rather than being horizontal or vertical, because (a) there is less tendency for adjacent marks to touch, (b) the eye is less sensitive to diagonal lines than to vertical or horizontal lines, and (c) printing and scanning non-uniformities tend to be horizontal (banding) or vertical (photodetector array response variations). In an embodiment, the two glyphs may each be elongated multi-pixel symbols having the same number of adjacent "ON" pixels and differ from each other in their rotation from the vertical. These specific glyphs are readily discernible from each other, even in the presence of significant distortion and image degradation, because they do not tend to degrade into a common shape.

In embodiments, the different glyph markings not only have different orientations, but also different conductive/substantially non-conductive features. By employing different conductivity glyph markings, an advantage is that the capacity for encrypting and storing information can be significantly increased, and that two different mechanisms for encryption are used. First is the glyph orientation (for example, left or right) as discussed above. Second is the different conductivities of the glyphs, as described above. This provides for four different states that may be used as a mechanism of encrypting more information on the same surface of a substrate. With conventional glyphs, one uses only the first mechanism (glyph orientation), which provides only two states. An example of the four states achievable when using printed glyphs of different conductivities to form the glyphs may be as follows: (1) oriented right/conductive (binary code 00), (2) oriented right/non-conductive (binary code 01), (3) oriented left/conductive (binary code 10), and (4) oriented left/non-conductive (binary code 11). Thus, in embodiments, the machine readable code format comprises a set of four glyphs, wherein each glyph corresponds to a different digital value selected from the group consisting of 00, 01, 10 and 11, and wherein the four glyphs comprise one of two different orientations and one of two different conductivities.

The printed markings may have a very small width and/or diameter, for example limited only by the resolution of the image forming device. An average width or diameter of the printed markings may be from, for example, about 10 µm to about 1,000 µm, for example from about 10 µm to about 100 µm or from about 40 µm to about 100 µm.

The printed markings have an advantage in that as a result of the different conductivities of the markings, the set of printed markings cannot be copied or reproduced by today's office equipment such as copiers and scanners, because the copy would lack the conductivity features of the printed markings. Moreover, persons attempting to counterfeit or copy the item having the encrypted code thereon typically will not be able to discern the different conductivities in the printed markings. As a result, photocopied items may replicate the viewable pattern, but will lack the conductive/non-conductive aspects so that the item can be readily detected as a fake.

To form the printed markings that are either conductive or non-conductive, several methods may be used. Desirably, the printed markings all have a substantially same appearance as discussed above. Thus, in embodiments, the substantially non-conductive printed markings are comprised of a conductive material overcoated with a substantially non-conductive material. Desirably, the substantially non-conductive overcoating is formed of a substantially transparent material. In this way, the conductive and substantially non-conductive printed markings will have a substantially same appearance, all appearing the same as the conductive printed markings. The overcoating will render the previously formed conductive printed markings substantially non-conductive, for example by preventing the conductive material from being able to complete a conductive path, and the height differential as a result of the thin overcoating, for example, an overcoating having a thickness of from about 1 μm to about 50 μm, such as from about 1 μm to about 15 μm, will still be indistinguishable to a human viewer.

As the overcoating material, any insulative marking material may be used, for example including polyvinyl alcohol, polycarbonates, polystyrenes, polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, and epoxy resins and the like. Derivatives refers to, for example, any compound derived or obtained from the parent substance. Copolymer materials such as polystyrene-acrylonitrile, polyethylene-acrylate, vinylidene chloride-vinylchloride, vinylacetate-vinylidene chloride, and styrene-alkyd resins are also examples of suitable overcoating materials. The copolymers may be block, random, or alternating copolymers. Appropriate insulating polymers compatible with either aqueous or organic based marking materials are available. As an example, for water-based marking materials, polyvinyl alcohol, which is soluble in water, can be used. For organic based marking materials, polymethyl methacrylate (PMMA) or polystyrene may be used. Thus, any suitable ink or toner vehicle may be used as the overcoating, wherein the vehicle is desirably free of any colorant so that the marking material is substantially transparent as discussed above.

In embodiments, the conductive printed markings and the substantially non-conductive printed markings are comprised of a same material with the exception that the substantially non-conductive printed markings include an effective amount of an insulating polymer to render the material substantially non-conductive. By adding a non-conductive polymer into an otherwise conductive marking material, conductivity of the marking material decreases, for example because the contact between conductive particles in the marking material vehicle ink becomes limited.

As conductive marking materials, any conductive marking material may be used. For example, the conductive marking material may comprise a vehicle having a conductive material dispersed therein, or may be comprised of a vehicle that is itself conductive, and may contain colorants. The marking materials may also include a wax and/or other conventional additives such as flow aids, charge additives, drying aids, antioxidants, UV absorbers, colorfastness agents, and the like.

Any conventional marking materials, inclusive of inks and toners, may be used. Examples of suitable marking materials include inks, including lithographic and flexographic inks, aqueous inks, including those suitable for use with ink jet printing processes, liquid and dr toner materials suitable for use in electrostatic imaging processes, solid hot melt inks, including those suitable for use with ink jet printing processes, and the like. As indicated above, solid inks may provide particularly desirable control and results.

The marking materials typically include at least a vehicle with a colorant such as pigment, dye, mixtures of pigments, mixtures of dyes, or mixtures of pigments and dyes, therein. The colorant may be present in a colored marking material in any desired amount, for example from about 0.5 to about 75% by weight of the marking material, for example from about 1 to about 50% or from about 1 to about 25%, by weight of the marking material.

As colorants, examples may include any dye or pigment capable of being dispersed or dissolved in the vehicle. Examples of suitable pigments include, for example, PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); HOSTAPERM Blue B2G-D (Clariant); Permanent Red P-F7RK; HOSTAPERM Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL, Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DUPONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Examples of suitable dyes include Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Example solvent dyes include spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146[C.I. 12700] (BASF), Sudan Red 462[C.I. 260501] (BASF), mixtures thereof and the like.

As the marking material vehicle, any ink or toner vehicle may be suitably used. Examples include polyester, polyacrylate, polyolefin, polyamide, polyvinyl alcohol, and the like. For phase change solid inks, the vehicle may be any of those described in U.S. patent application Ser. No. 11/548,775, U.S. Pat. No. 6,906,118 and/or U.S. Pat. No. 5,122,187, each incorporated herein by reference in its entirety. The ink vehicle may also be radiation curable, for example any of the ink vehicles described in U.S. patent application Ser. No. 11/548,774, incorporated herein by reference in its entirety.

Specific examples of conductive marking materials include, for example, those described in U.S. Pat. No. 6,187,083 (conductive sulfonate salt additive), U.S. Pat. No. 6,096,124 (conductive quaternary compound) and U.S. Pat. No. 6,593,398 (conductive materials include phosphorous compounds such as (1) azidotris (di-ethylamino) phosphonium bromide, (Aldrich #30,082-2), (2) tetrabutyl phosphonium chloride, (Aldrich #14,480-0), (3) dodecyltriphenyl phosphonium bromide, (Aldrich #17,262-6), (4) stearyltributyl phosphonium bromide, (Aldrich #29,303-2) and sulfur compounds such as (5) trimethylsulfonium methyl sulfate, (Aldrich #30,359-3), (6) 3-ethyl-5-(2-hydroxyethyl)-4-methylthiazolium bromide, (Aldrich #33,124-4); (7) 3,4-dimethyl-5-(2-hydroxyethyl)thiazolium iodide, (Aldrich #25,782-6), and the like. Any other suitable conductive material additive may be used. Other suitable conductive marking materials include conductive particles dispersed in a base, like for example silver, silver chloride or graphite particles dispersed into a polymeric base. Specific examples include conductive inks like PI-2000, PI-2200, PI-2500, PI-2600, all highly conductive silver based inks from Dow Corning. Also suitable are conductive polymers such as polyaniline, polypyrole, polystyrene sulfonate-doped poly(3,4-ethylenedioxythiophene), and the like, metal nanoparticles such as gold, silver, copper, nickel nanoparticles, and their alloy and mixture thereof, metal precursors such as silver carboxylate, silver nitride, and the like, and metal oxide such as indium tin oxide. Typically, the marking material contains from, for example, about 0.5% by weight to about 5004 of the marking material, such as from about 0.5% to about 25% by weight or from about 0.5% to about 15% by weight of the marking material. In addition, the vehicle itself may be a conductive material. As an example, U.S. Pat. No. 6,176,909 describes an ink vehicle comprised of a conductive pyridinium compound.

The marking material vehicle may also include a wax such as paraffins, microcrystalline waxes, polyolefin waxes such as polyethylene or polypropylene waxes, ester waxes, fatty acids and other waxy materials, fatty amide containing materials, sulfonamide materials, resinous materials made from different natural sources (tall oil rosins and rosin esters, for example), and synthetic waxes. The wax may be present in an amount of from about 5% to about 25% by weight of the marking material. Examples of suitable waxes include polypropylenes and polyethylenes commercially available from Allied Chemical and Petrolite Corporation, wax emulsions available from Michaelman Inc. and the Daniels Products Company, EPOILENE N-15™ commercially available from Eastman Chemical Products, Inc., VISCOL 550-P™, a low weight average molecular weight polypropylene available from Sanyo Kasei K.K., and similar materials. The commercially available polyethylenes selected usually possess a molecular weight of from about 1,000 to about 1,500, while the commercially available polypropylenes utilized for the toner compositions of the present invention are believed to have a molecular weight of from about 4,000 to about 5,000. Examples of suitable functionalized waxes include, for example, amines, amides, imides, esters, quaternary amines, carboxylic acids or acrylic polymer emulsion, for example JONCRYL™ 74, 89, 130, 537, and 538, all available from SC Johnson Wax, chlorinated polypropylenes and polyethylenes commercially available from Allied Chemical and Petrolite Corporation and SC Johnson wax.

As indicated above, the printed markings may be formed on any desired non-conductive image receiving substrate. Common substrates include, for example, paper, cardboard, plastic and the like.

The printed markings may be formed by any suitable process that can form images on a substrate. For example, the printed markings may be formed, for example, using existing ink jet printing devices and the like. Where a substantially non-conductive overcoating is used over a conductive marking material, any device that can put the overcoating upon the prior formed conductive printed marking may be used. For example, an ink jet printer that can multiply pass over same portions of a substrate in registration may be used.

Thus, the system for embedding and recovering the information on a substrate comprises an image forming device for writing the printed markings. The image forming device receives data regarding the printed markings to be formed on the substrate, and forms the printed markings corresponding to the data. The system may also include a processor that converts the information to be encrypted into the appropriate digital values and/or into the data for forming the printed markings for use by the image forming device.

As the image forming device, an ink jet device, a xerographic device or other device for forming images with a marking material may be used. Suitable methods include electrostatic printing processes such as electrophotography and ionography, wherein an electrostatic latent image is formed and developed with the marking materials, either dry or liquid; ink jet printing processes, including both continuous stream processes and drop on demand processes (including piezoelectric, thermal or bubble jet, or the like), wherein droplets of ink are jetted in imagewise fashion onto the desired substrate; hot melt ink jet processes, wherein an ink is solid at room temperature and liquid at elevated temperatures and wherein the ink is heated to a temperature above its melting point and jetted onto a substrate in an imagewise fashion; conventional printing processes, including lithographic and flexographic processes; and the like. In embodiments, the image forming device is an ink jet device, for example for jetting solid inks.

Printed markings may thus be generated with an ink jet device, for example a thermal ink jet device, an acoustic ink jet device, a piezoelectric ink jet device and the like, and concurrently causing droplets of molten ink to be ejected in an imagewise pattern forming the coded printed markings onto an image receiving substrate such as paper, cardboard, plastic, transparency material and the like. The ink is typically included in a reservoir connected by any suitable feeding device to the corresponding ejecting channels of an ink jet head. In the jetting procedure, the ink jet head may be heated, by any suitable method, to the jetting temperature of the ink. The device may include both a conductive ink and a substantially non-conductive ink or overcoating material.

In embodiments, the image forming device may also comprise both a xerographic device and an ink jet device. For example, the image forming device may include a xerographic device and a separate ink jet device containing the marking material for forming the printed markings. The xerographic device can be used to form a reproduced image, while the ink jet device can print the encrypted information onto each document. Desirably, the ink jet device is downstream of the xerographic device in a process direction, so that the encrypted information is not overprinted by the xerographic device, but the ink jet device may also be upstream of the xerographic device.

The printed markings can be machine read and/or decoded by any suitable or desired method. The reading is based on the different conductivities of the printed markings. The reader, understanding the order in which to tread the printed markings as was detailed above, reads whether each printed marking is either conductive or non-conductive. Detection can be easily achieved by measuring either resistance (low for conductive printed markings and high for substantially non-conductive printed markings) or by measuring a current when the conductive printed markings are connected to a current source. The printed markings will close the circuit (measurable current is detected) while the substantially non-conductive printed markings will result in an open circuit (no measurable current). Any suitable measuring device, for example including optical detectors, using current and/or resistance detection devices, may be used.

In addition, for glyph printed markings, bitmap images of the glyphs can be processed even when image distortion or degradation has occurred by, for example, facsimile transmission, scanning of photocopies, or the like. In certain decoders, the image processing which is performed for decoding the glyph codes first locates the glyphs in the X-Y coordinates of the bitmap image space, then constructs a table for indexing the glyphs in the spatial order in which data was encoded in them, and then analyzes the glyphs in indexed order for sequentially extracting the data values encoded therein. In other decoders, the image processing classifies the glyphs by their shapes while concurrently locating their centers in the bitmap image space, so the decoded values of the glyphs conveniently are indexed to the bitmap image space. These spatially indexed decoded data values may be sorted in accordance with the spatial template or pattern that governs their spatial ordering if it is desired to restore their serial order in the time domain. Once the printed markings are read and/or translated into the digital values, appropriate software may be used to convert the values to human readable information.

EXAMPLE

To demonstrate the ability to read different conductivity regions, four conductive squares were deposited on a sheet of paper by vacuum deposition of copper. After deposition, all four squares were conductive. To illustrate the concept for detection and hiding information, square #3 was overcoated with a solution of insulating PMMA in methyl ethyl ketone (MEK) as a solvent. After drying, there is no obvious sign of presence of the coating layer on top of square #3 when compared with the uncoated ones.

Resistance measurement: resistance was measured using a multi-meter. Squares #1, #2 and #4 measured a resistance <100Ω, a typical number for a conductive copper layer. The resistance of the square #3 (PMMA coated) was higher than the limit of the multi-meter (>2 M Ω). This demonstrates detection of conductive and non-conductive areas by measuring resistance.

Current measurement: a reader was built by sticking eight adhesive copper tape pieces to a plastic substrate in such a way that each pair of copper tapes can get in contact with a square. The conductive tapes are not connected between them. For detection, the reader was placed on top of the paper containing the squares so that each square is in contact with a pair of conductive tapes. Each pair of conductive tape is connected to a current supply set to 50 mA. Squares #1, #2 and #4 closed the circuit because they are conductive. As a result, a 50 mA current was measured for each of these three squares. Square #3 did not close the circuit (non-conductive due to PMMA coating) and as a result, no current through the device was observed. Any suitable amount of current can be passed through the closed circuits. This demonstrates detection of conductive and non-conductive areas by measuring current.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. An item comprising a substrate having thereon a multiplicity of separate printed markings, wherein the printed markings include both conductive printed markings and substantially non-conductive printed markings, and wherein the substantially non-conductive printed markings are comprised of a conductive material overcoated with a substantially non-conductive material.

2. The item according to claim 1, wherein the conductive printed markings and the substantially non-conductive printed markings have a substantially same appearance to a viewer.

3. The item according to claim 1, wherein the substantially non-conductive overcoating is substantially transparent.

4. An item comprising a substrate having thereon a multiplicity of separate minted markings, wherein the printed markings include both conductive printed markings and substantially non-conductive printed markings, and wherein the conductive printed markings and the substantially non-conductive printed markings are comprised of a same material with the exception that the substantially non-conductive printed markings include an effective amount of an insulating polymer to render the material substantially non-conductive.

5. The item according to claim 1, wherein the material of the conductive printed markings comprises a vehicle having a conductive material dispersed therein or is comprised of a conductive vehicle.

6. The item according to claim 1, wherein the conductive printed markings represent 0s or 1s and the substantially non-conductive printed markings represent the other of 0s or 1s, such that the printed markings comprise a binary based information encryption code.

7. The item according to claim 1, wherein the conductive printed markings and the substantially non-conductive printed markings are each in the form of text in an image.

8. The item according to claim 1, wherein the substrate comprises a non-conductive paper, cardboard or plastic.

9. The item according to claim 1, wherein the item is a document.

10. A method of preparing an item having security elements formed thereon, comprising forming a multiplicity of separate printed markings on a substrate, wherein the printed markings include both conductive printed markings and substantially non-conductive printed markings, with an image forming device, wherein the forming comprises first forming every printed marking as a conductive printed marking with a conductive marking material, and subsequently forming an overcoating of a substantially non-conductive marking material on only those formed conductive printed markings that are to be substantially non-conductive printed markings.

11. The method according to claim 10, wherein the substantially non-conductive marking material overcoating is substantially transparent.

12. A method of preparing an item having security elements formed thereon, comprising forming a multiplicity of separate printed markings on a substrate, wherein the printed markings include both conductive printed markings and substantially non-conductive printed markings, with an image forming device, wherein the forming comprises forming the conductive printed markings with a conductive marking material and forming the substantially non-conductive printed markings with a substantially non-conductive marking material, wherein the conductive marking material and the substantially non-conductive marking material are the same with the exception that the substantially non-conductive printed marking material contains an effective amount of an insulating polymer to render the material substantially non-conductive.

13. The item according to claim 4, wherein the material of the conductive printed markings comprises a vehicle having a conductive material dispersed therein or is comprised of a conductive vehicle.

14. The item according to claim 4, wherein the insulating polymer is comprised of polyvinyl alcohol, polymethyl methacrylate or polystyrene.

* * * * *